United States Patent [19]

Davis et al.

[11] 4,071,829

[45] Jan. 31, 1978

[54] COHERENT PHASE DETECTOR USING A FREQUENCY DISCRIMINATOR

[75] Inventors: Robert Curtis Davis, Melbourne Beach; Daniel Dix McRae, W. Melbourne, both of Fla.

[73] Assignee: Harris Corporation, Cleveland, Ohio

[21] Appl. No.: 740,365

[22] Filed: Nov. 9, 1976

[51] Int. Cl.² ............... H03D 3/02; H04L 27/14
[52] U.S. Cl. .................. 329/122; 325/320; 325/346; 329/126; 329/136
[58] Field of Search ........ 329/104, 105, 110, 122–125, 329/126, 136; 325/320, 346; 178/66 A

[56] References Cited

U.S. PATENT DOCUMENTS

| | | | |
|---|---|---|---|
| 3,179,748 | 4/1965 | Farrow | 329/105 X |
| 3,501,704 | 3/1970 | Webb | 329/104 |
| 3,636,454 | 1/1972 | Pasternack et al. | 325/320 |

Primary Examiner—Siegfried H. Grimm

[57] ABSTRACT

A coherent phase detector using a frequency discriminator for reducing a frequency encoded signal to baseband, thereby avoiding the necessity of generating a coherent RF phase reference signal. A baseband processor is provided to compensate for error components arising in the frequency discriminator output. The baseband processor includes feedback loops for DC level correction and automatic gain correction. A novel scheme is also described for reducing the influence of interbit crosstalk on the operation of the baseband processor.

7 Claims, 5 Drawing Figures

COHERENT PHASE DETECTOR

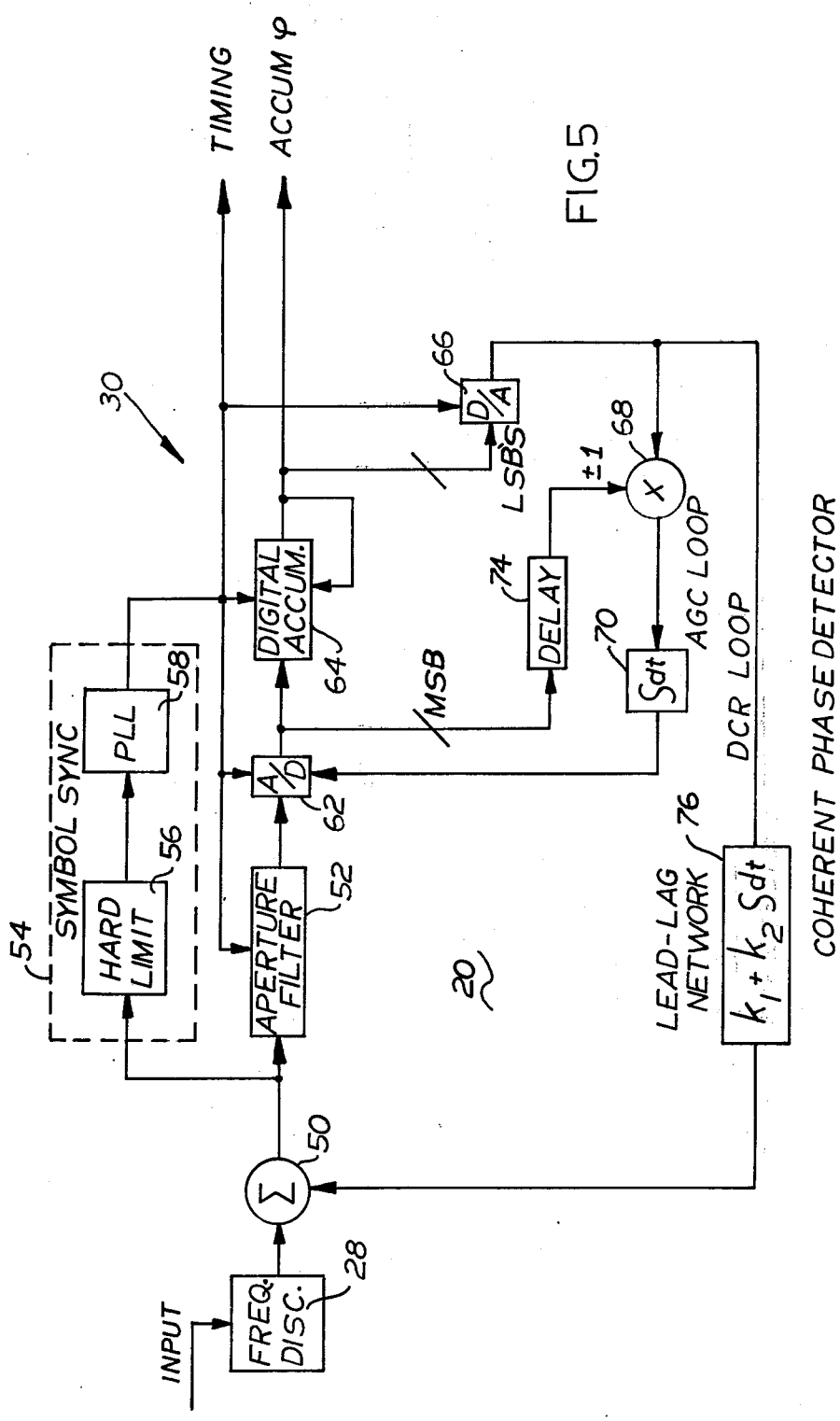

COHERENT PHASE DETECTOR USING A FREQUENCY DISCRIMINATOR

BACKGROUND OF THE INVENTION

The present invention relates to the art of demodulation of frequency modulated signals, and more particularly to a system for generating coherent phase measurements of any signal whose frequency is modulated so that a predetermined amount of phase shift occurs in selected time intervals.

Frequency shift keyed (FSK) modulation techniques are commonly used in digital signaling over microwave radio links. In these applications, multilevel FSK with narrow deviation is currently preferred because of the relatively compact frequency spectrum occupied thereby.

In FSK systems, the carrier is shifted between two or more discrete frequencies in accordance with the value of a modulation input signal. In the simplest, binary case only two frequencies, commonly referred to as mark and space frequencies, are required. Each frequency denotes one of the two possible input states, i.e. a binary "1" or "0". In multilevel FSK, the amount of information which can be communicated over the link is expanded by increasing the number of frequencies which can be transmitted in each signaling interval. In 4-ary FSK, for example, any one of four discrete frequencies may be transmitted at any given time, allowing coded transmission of two digital bits at a time.

Multilevel FSK is not easily demodulated, however. One method which has been successfully used in the demodulating of multilevel FSK signals involves the coherent detection of the phase of the incoming FSK signal with respect to a reference signal. The coherent phase measurements so produced are then used to determine the amount of phase shift which occurred over the signaling interval. Since phase shift is porportional to frequency shift, it can be used to determine the data content of the signal. A multilevel FSK modulation/demodulation system of this type is described in a paper entitled "FM-CPSK Narrow Bank Digital FM with Coherent Phase Detection" by D. M. Brady, found in the 1972 International Conference on Communications.

In current practice, a controlled RF oscillator is used to establish a coherent reference for the purpose of detection of the phase of the FSK signal. This is usually accomplished by means of a quadrature phase detector. In these systems, the RF reference frequency must be carefully adjusted and controlled to avoid any frequency drift. Such drift would produce corresponding offsets in the detector output signal, thereby increasing the probability of error in the data subsequently recovered therefrom.

It is an object of the present invention to provide a coherent phase detector for use in the demodulation of frequency encoded signals and which does not require the generation of a coherent reference signal.

It is an additional object of the present invention to provide apparatus for baseband processing the output of a frequency discriminator to obtain coherent phase measurements.

It is yet another object of the present invention to provide a baseband processor having feedback loops for removing gain and DC offset error components from the baseband signal.

In accordance with the present invention, apparatus is provided for demodulating a frequency encoded signal. A frequency discriminator is provided for reducing the incoming signal to baseband. This baseband signal is then error corrected by a baseband processor.

In accordance with another aspect of the present invention, a baseband processor is provided for correcting error components in the baseband signal. This baseband processor includes feedback loops for correcting the DC offset and gain of the baseband signal.

In accordance with a more limited aspect of the present invention, the error components in the baseband signal are detected by providing an analog-to-digital convertor which responds to the magnitude of the baseband signal to provide a corresponding digital signal at the conclusion of each bit interval. The system is calibrated so that the least significant bits of this digital signal will assume predetermined values when the DC offset and gain of the baseband signal are correctly adjusted. Apparatus is further provided for utilizing the least significant bits of the digital signals to generate DC level correction and gain correction signals. These correction signals are fed back to previous stages in the baseband processor to provide error correction thereof.

In accordance with yet another aspect of the present invention, a baseband processor is provided having means for correcting the system gain by cross-correlating the hard-limited baseband signal with the error component of the baseband signal to generate a gain correction signal to be used to adjust the gain of the system. Means are also provided for introducing a delay in this cross-correlation process so as to avoid the production of inaccurate gain correction signals as a result of interbit crosstalk.

BRIEF DESCRIPTION OF THE DRAWINGS

The foregoing and other important objects and advantages of the present invention will become more readily apparent from the following description of the preferred embodiment, as taken in conjunction with the accompanying drawings which are a part hereof and wherein.

DETAILED DESCRIPTION

Although the present invention will be described with respect to a system for demodulating signals which have been modulated in accordance with commonly used, FSK techniques, it will become apparent as this disclosure is more fully made that the invention has broader application to the generation of coherent phase measurements of any signal whose frequency is modulated in any manner, so long as discrete amounts of phase shift occur in known time intervals.

Figure 1:
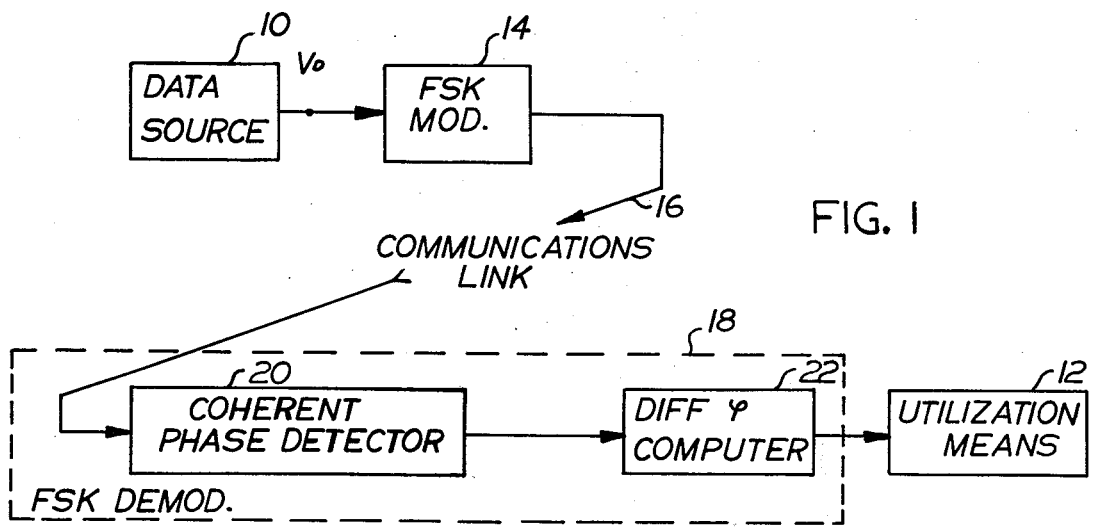
FIG. 1 is a block diagram of a communications system employing FSK modulation.

In FIG. 1 there is shown a block diagram of a communications system in which multilevel FSK modulation could advantageously be used. A data source 10 provides signals which are to be transmitted to a utilizaiton means 12. Modulator 14 responds to the data signals by modulating a carrier signal in accordance with multilevel FSK modulation techniques. The FSK signals are then transmitted over any conventional communications link 16. These FSK signals are processed by an FSK demodulator 18 which recovers the data content from the FSK signals and provides it to utilization means 12.

Figure 2:
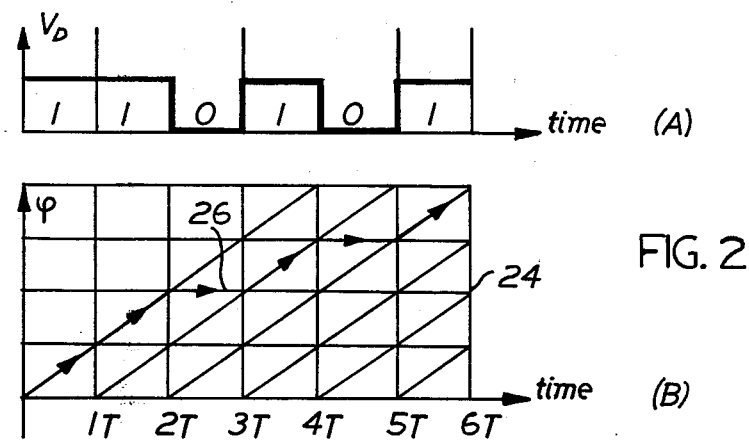
FIG. 2 is a graphical representation of signals occurring in the communications system of FIG. 1.

In accordance with the principles of the present invention, FSK demodulator 18 includes a coherent phase detector 20 and a differential phase computer 22. Reference will now be made to FIG. 2 to provide a more complete understanding of the operation of the communications network pictured in FIG. 1. To facilitate understanding of the basic features of the present invention, the following description will be made with reference to the simpler, binary FSK case, wherein only two discrete frequencies are utilized to transmit a data signal. It will be appreciated, however, that the concepts disclosed herein can readily be applied to modulation/demodulation systems employing multilevel FSK signals. It will further be appreciated that it is in those systems employing multilevel FSK signals that the present invention will find maximum utility.

There is shown in FIG. 2 an example of a data train of digital nonreturn-to-zero (NRZ) signals corresponding to the serial binary data train 110101. This digital data train is directed to FSK modulator 14 which provides a mark frequency signal during that time in which the incoming data train is at a binary "1" state, and a space frequency signal during the interval of time when the incoming data train is at a binary "0" level; transitions between mark and space frequencies are accomplished in such a manner that no phase discontinuities exist. Methods of accomplishing this type of modulation are well-known in the art and will not be dealt with herein. A simple voltage controlled oscillator (VCO) could be used, for example. The composite signal, comprised of mark and space frequencies, is transmitted over communications link 16 to FSK demodulator 18.

The present invention provides an FSK demodulator 18 which demodulates the FSK signals by measuring the phase of the incoming signal with respect to a reference signal, and then comparing the accumulated phase at the beginning and the end of each bit interval to determine the data content of the FSK signal during that bit interval. In accordance with the present invention, FSK demodulator 18 includes a coherent phase detector 20 and a differential phase computer 22.

Coherent phase detector 20 ideally provides an output signal corresponding to the difference between the actual phase of the FSK signal and the phase it would have had if it had been oscillating continuously at the space frequency. Since the frequency of the FSK signal is modulated, the phase will change in accordance therewith. The coherently measured phase will follow one of the paths outlined by the phase trellis 24 shown in FIG. 2b. The particular path followed (hereinafter referred to as the phase trajectory) will be dependent upon the data content of the FSK signal. During the transmission of the mark frequency, the accumulated phase of the incoming signal will increase at a linear rate. On the other hand, when the space frequency is transmitted, the accumulated phase of the incoming signal will not change. Thus, if the data encoded in the FSK signal takes the form shown in FIG. 2a, phase trajectory 26 (shown in FIG. 2b) will result. For purposes of description, it is arbitrarily assumed that the the accumulated phase at time $t=0$, is zero. Phase trajectory 26 represents the ideal case, unencumbered by error components. Because of this, the accumulated phase passes precisely through a phase node of the phase trellis at the conclusion of each bit interval, e.g. at times $t = 1T, 2T, 3T$, etc.

Figure 3:
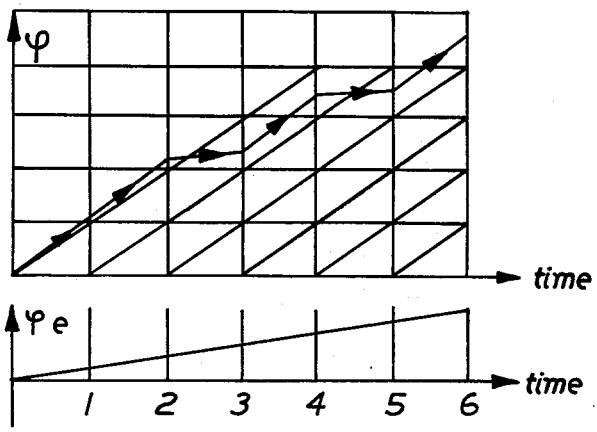
FIG. 3 is a graphical representation of the signals of FIG. 2 wherin a DC error exits in the baseband signal.
Figure 4:
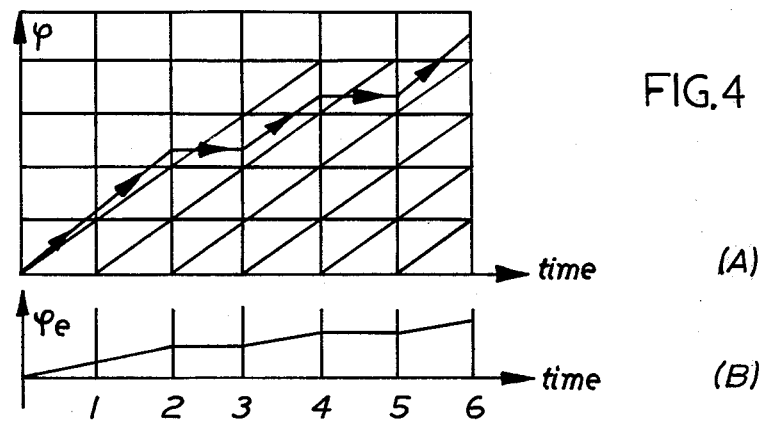
FIG. 4 is a graphical representation of the signals of FIG. 2 wherein a gain error exists; and, FIG. 5 is a detailed blocked diagram of a coherent phase detector in accordance with the present invention.

FIGS. 3 and 4 graphically depict nonideal cases in which the phase trajectory of FIG. 2 is perturbed by DC offset and incorrect gain components, respectively. These figures will be described in greated detail with reference to FIG. 5.

Referring now to FIG. 5, a phase detector 20, in accordance with the present invention, is diagrammatically shown. Phase detector 20 includes a frequency discriminator 28 for reducing the incoming signal to baseband, and a baseband processor and integrator 30 for processing the baseband signal to provide the desired coherent phase measurements.

Frequency discriminator 28 may be of conventional form thus including a limiter for removing amplitude variations from the incoming FSK signal, and a discriminator for producing an output voltage whose level is linearly related to the frequency of the incoming signal. Preferably, frequency discriminator 28 will be biased so that the output thereof for a space frequency input will be at or near a zero voltage level. The output of frequency discriminator 28 will thus be a baseband signal having roughly the same form as the NRZ data train impressed upon the FSK signal. This signal will, however, be perturbed by a number of error components. Because of frequency offset that will occur practically, the voltage out of the discriminator will not be exactly zero when the space frequency is sent. Also, the gain-to-frequency deviation of the output signal provided by the discriminator may be significantly inaccurate.

The output of frequency discriminator 28, which ideally represents the derivative of the phase of the incoming signal, measured with respect to the space frequency, is received by the baseband processor and intergrator 30. There, the signal is directed to a summing circuit 50 which combines the baseband signal with a DC correction signal provided by a DC correction loop described hereinafter. The output of summing circuit 50 comprises a DC corrected baseband signal. This signal is directed to an aperture filter 52 and a symbol synchronizer 54.

Symbol synchronizer 54 responds to the DC corrected base-band signal to provide timing signals for use in synchronizing the operation of both the baseband processor and the differential phase computer with the bit interval timing of the incoming signal. Symbol synchronizer 54 includes a hard-limit circuit 56 which compares the incoming baseband signal against fixed limits to provide an output signal having transitions between two voltage levels whenever the incoming baseband signal passes through the fixed limits. Hard-limited circuit 56 may comprise a voltage comparator, with hysteresis. The transitions on the output of hard-limited circuit 56 will occur in synchronism with bit transitions in the encoded data train and can be used to synchronize a phase-locked loop 58 at the bit rate. Thus, a timing signal will be produced by phase-locked loop 58 which is synchronized with the bit timing of the incoming signal.

Aperture filter 52 may conveniently comprise an integrate and dump circuit of conventional form. When so constructed, aperture filter 52 will be initialized ("dumped") to a zero voltage level at the beginning of each bit interval, and will then integrate the baseband signal over the bit interval so as to provide an output signal corresponding to the amount of phase shift which occurred over the signaling interval. At the conclusion of each bit interval, and prior to dumping of aperture filter 52, an analog-to-digital convertor 62 converts the intergrated baseband signal to a multi-bit digital signal having a value corresponding to the magnitude of the baseband signal. The digital output of A-to-D convertor 62 is directed to a digital accumulator 64 which accumulates the digital signal with the digital signal previously stored therein to provide the coherent phase measurements required of the baseband processor. These coherent phase masurements may then be processed by any suitable differential phase computer 22 to provide hard decisions regarding the data content of the FSK signal in each bit interval. This differential phase computer, which forms no part of the present invention, may take the form of the Differential Phase computer described in the D. M. Brady article cited previously in the BACKGROUND.

In accordance with the teachings of the present invention, dynamic compensation is provided of errors arising from several sources. It will be recognized that in the absence of this error correction feature the phase measurments provided by coherent phase detector 20 would deviate from the optimal or "correct" values, resulting in degraded detector performance.

In the simplified, binary FSK case being described, either a specific phase shift will occur over a single bit interval (indicating that a digital "1" has been received) or no phase shift will occur (indicating receipt of a digital "0"). In the case of multilevel FSK, the phase may shift in several different amounts. Through appropriate selection of the frequencies of the signals transmitted over the link, these different amounts of phase shift can be selected so that the change in phase arising in a single bit interval will only occur in multiples of a selected quantum of phase shift. Because of this, the amount of measurement error can be determined by quantizing the measured phase shift at the conclusion of each bit interval. The integral and fractional portions of the measured phase shift can then be easily separated.

This quantization function is conveniently accomplished in the present invention through the use of A/D convertor 62. By defining the selected quantum of phase shift to be a specific even digital number, for example, 0010000, it will be seen that, by definition, any non-zero component in the LSB's of the measured phase shift will represent an error component. Since this measurement will be accumulated in digital accumulator 64, the LSB's in the output thereof will also indicate the magnitude of the error component.

Two feedback loops are provided which respond to the LSB's of the output of digital accumulator 64, to provide correction signals for removing error components resulting from DC offset and incorrect gain of the frequency discrimination output. Since the LSB's of the output of digital accumulator 64 represent the cumulative result of both error components, some method must be used for determining to what extent each source of error was responsible for the error observed. The method used to distinguish between the two types of error components may be more readily understood through an examination of the diagrams of FIGS. 3 and 4.

If a DC offset existed in the discriminator output and were the only form of distortion present in the baseband signal, the accumulated phase measurements derived by intergrating the baseband signal would follow the phase trajectory shown in FIG. 3a. Since the DC error would be integrated along with the "correct" signal, the error component would continually increase in the manner illustrated in an exaggerated form in FIG. 3b, regardless of the data content of the signal.

If, on the other hand, a gain error existed and were the only form of distortion present, then the accumulated phase would follow the phase trajectory shown in FIG. 4a. It will be noted that, in this case, the variations in the error component are related to the data content of the signal, in the sense that the error will only increase during those bit intervals in which a digital "1" has been received. This is shown more clearly in FIG. 4b which graphically illustrates the accumulated error component.

It is this distinction, relating to the fact that one type of error component is related to the data content of the signal while the other is not, that the present invention utilizes to recognize the contribution of each.

This feature is implemented by providing a gain correction loop which will only respond to errors which correlate with the data content of the signal. This, in turn, is accomplished by cross-correlating the most significant bit (MSB) of the digital signal provided by A/D convertor 62 (which indicates the data content of the received signal) with the error component provided by D/A convertor 66. Thus, when the MSB is a "1", multiplier 68 will provide an analog output corresponding to the analog error signal provided by D/A convertor 66. When the MSB is a "0", however, the analog output of multiplier 68 will correspond to the additive inverse of the analog output of D/A convertor 66 (i.e., "−1" times the output of D/A convertor 66). These signals are combined by an integrator 70 to provide the gain correction signal. This correction signal can then be used to control the gain of a variable gain element at some point in the baseband processor. One method of accomplishing this variable gain could be through use of a separate, variable gain stage which would be responsive to the output of integrator 70. In the preferred embodiment, however, the output of integrator 70 is directed to A/D convertor 62 and is used to vary the reference signal used in the analog-to-digital conversion process.

As stated previously, this gain correction loop will not generally respond to errors in DC offset. This is because, statistically considered, the MSB of A/D convertor 62 will be "0" as often as "1". Consequently, when the error signal supplied by the LSB's of digital accumulator 64 is unrelated to the data content of the signal, the gain correction signal provided by integrator 70 will be increased as often as it will be decreased. Delay 74 is introduced to avoid the interference with the operation of the gain control loop which would otherwise result from the presence of interbit crosstalk, and will be described in greater detail herinafter.

A DC correction loop is provided to respond to the residual error signal left uncorrected by the gain correction loop. Thus, a loop filter 76 responds to whatever analog error voltage remains at the output of D/A convertor 66 to provide a DC correction signal. This signal is directed back to summing circuit 50 to be additively combined with the baseband signal.

A characteristic problem associated with the operation of most IF filters is the production of unwanted crosstalk components within the demodulated baseband signal. The data content of each bit interval is, in effect, smeared over several bit intervals. Although it is not the purpose of the present invention to provide compensation for this form of distortion, means must be included for reducing the effect of such crosstalk on the error compensation loops already described. The compensation for this distortion can be accomplished in the differential phase computer 22 when making symbol decisions. This crosstalk does not interfere with the operation of the DC correction loop, since it is statistically random in nature. Since it is correlated with the data content of the baseband signal, however, it does interfere with the operation of the gain correction loop. It has been discovered that the effects of this interbit crosstalk can, in large part, be avoided by introducing a delay 74 such that the most significant bit of the signal provided by A/D convertor 62 does not arrive at multiplier 68 until sometime following the time that it would otherwise have arrived. The delay factor is selected to exceed the time interval over which the crosstalk extends. If some other method were used to reduce the effect of such crosstalk, this delay would be unnecessary.

The following theoretical analysis is provided to enhance the understanding of the purpose and effect of delay 74.

We shall call the aperture filter output on the $i^{th}$ symbol time, $F_i$. We will consider that the $i^{th}$ frequency transmitted = $Y_i$. In the absence of i.f. filtering or any other filtering in the link, $F_i$ would simply be (No crosstalk case)

$$F_i = Y_i T(1 + \epsilon_g) \quad (1)$$

Where T = symbol time.
$\epsilon_g$ = gain error

With filtering in the link, however, the aperture filter output will in general contain some crosstalk from previous symbols. Realistically then, $F_i$ is given by:

$$F_i = T \sum_{n=0}^{\infty} C_n Y_{i-n} (1 + \epsilon_g) \quad (2)$$

where
$C_n$ is a measure of the crosstalk at the $i^{th}$ filter output caused by the $n^{th}$ preceeding frequency symbol.
$\epsilon_g$ = gain error We shall assume that normalization of the filter output is such that $$\sum_{n=0}^{\infty} C_n = 1 \quad (3)$$

Since the accumulator output at the $i^{th}$ symbol time, $A_i$, is the sum of all prior aperture filter outputs, we have:

$$A_i = \sum_{k=0}^{\infty} F_{i-k} \quad (4)$$

$$= T(1 + \epsilon_g) \sum_{k=0}^{\infty} \sum_{n=0}^{\infty} C_n Y_{i-k-n} \quad (5)$$

If we let $k + n = j$ then Equation 5 becomes $$A_i = T(1 + \epsilon_g) \sum_{j=0}^{\infty} Y_{i-j} \left( \sum_{k=0}^{\infty} C_{j-k} \right) \quad (6)$$

We now stipulate that the crosstalk be of finite duration, i.e., $C_m = 0$ if $m > N$.

Now, when $j \geq N$, $\sum_{k=0}^{\infty} C_{j-k} = \sum_{n=0}^{N} C_n = 1$ (7a)

and when $j < N$, $\sum_{k=0}^{\infty} C_{j-k} = \sum_{n=0}^{j} C_n$ (7b)

Equation (6) thus becomes $$A_i = T(1 + \epsilon_g) \left[ \sum_{j=0}^{N-1} Y_{i-j} \sum_{n=0}^{j} C_n + \sum_{j=N}^{\infty} Y_{i-j} \right] \quad (8)$$

The ideal accumulator output at time i, $\overline{A}_i$, would be the sum of all previous undistorted aperture filter outputs, i.e., $$\overline{A}_i = T \sum_{j=0}^{\infty} Y_{i-j} \quad (9)$$

Equation (9) defines the value of the phase node in the transmitted FSK signal. The error, $E_i$, in hitting the ideal phase node is then given by:

$$E_i = A_i - \overline{A}_i \quad (10)$$

Substituting Equations (8) and (9) into (10) we obtain after some manipulation $$E_i = T \sum_{j=0}^{N-1} \left[ (1 + \epsilon_g) \sum_{n=0}^{j} C_n - 1 \right] Y_{i-j} + T\epsilon_g \sum_{j=N}^{\infty} Y_{i-j} \quad (11)$$

If we cross-correlate $E_i$ and $Y_{i-M}$ we obtain $$\overline{E_i \cdot Y_{i-M}} = \begin{cases} T\epsilon_g \overline{Y_i^2} \text{ if } M \geq N \\ T\left[ (1 + \epsilon_g) \sum_{n=0}^{M} C_n - 1 \right] \overline{Y_i^2} \text{ if } M < N \end{cases} \quad (12)$$

assuming the $Y_i$ are uncorrelated random variables. We note that if $M \geq N$ the only way that the cross-correlation can be zero is for $\epsilon_g = 0$.

This suggests the gain control scheme previously described. The MSB from the A/D convertor 62 (corresponding to hard limited $Y_i$) is delayed and cross-correlated with the phase error. The amount of delay from the foregoing analysis is chosen large enough to get past the crosstalk caused by symbol $Y_i$.

A coherent phase detector has thus been described which utilizes a frequency discriminator and thus does not require the generation of a coherent RF phase reference signal. To compensate for error components existing in the frequency discriminator output, a baseband processor has been provided including DC level correction and automatic gain correction. A method has also been provided for reducing the influence of interbit crosstalk on the operation of the baseband processor.

Although the invention has been described with respect to a preferred embodiment, it will be understood that various alterations and arrangements of parts may be made without departing from the spirit and scope of the invention as defined in the appended claims.

What is claimed is:

1. Apparatus for use in a system for demodulating a frequency encoded signal comprising:
   frequency discriminator means responsive to said frequency encoded signal for providing a baseband signal corresponding to the derivative of the phase of said encoded signal; and, baseband processing means responsive to said baseband signal for providing an error compensated baseband signal, said baseband processing means comprising means for providing a timing signal related to the timing of said frequency encoded signal, means for integrating said baseband signal over a discrete timing interval to provide a phase shift signal representing the amount by which the phase of said frequency encoded signal has shifted over said interval, means for quantizing said phase shift signal into integral and fractional parts, and means responsive to said fractional part of said quantized phase shift signal for providing error compensation for said baseband signal whereby said baseband processing means provides an error compensated baseband signal to the remainder of said system for demodulating said frequency encoded signal.

2. Apparatus as set forth in claim 1 wherein said means responsive to said fractional part of said quantized phase shift signal comprises:

DC level correction means responsive to said fractional part for correcting the DC level of said baseband signal; and, automatic gain correction means responsive to said fractional part for correcting the gain of said baseband signal.

3. Apparatus as set forth in claim 2 wherein said automatic gain correction means comprises means for cross-correlating said fractional part of said quantized phase shift signal with said intergral part of said quantized phase shift signal, means for integrating the results of said cross-correlation to provide a gain correction signal, and, means responsive to said gain correction signal for correcting the gain of said baseband signal.

4. Apparatus as set forth in claim 3 wherein said automatic gain correction means further comprises means for delaying the presentation of said integral part of said quantized phase shift signal to said means for cross-correlating said parts of said quantized phase shift signal so that said integral part is not directly correlated with the corresponding said fractional part whereby the effects of interbit crosstalk are substantially avoided.

5. Apparatus as set forth in claim 1 and further comprising accumulator means responsive to said quantized phase shift signal for accumulating said phase shift so as to provide an output signal corresponding to the coherently measured, accumulated phase shift of said frequency encoded signal.

6. Apparatus as set forth in claim 5 wherein said means responsive to said fractional part of said quantized phase shift signal comprises means responsive to said output signal of said accumulator means so as to be indirectly responsive to said fractional part of said quantized signal.

7. Apparatus for processing a baseband signal derived from a frequency encoded signal comprising:

means for providing a timing signal related to the timing of said frequency encoded signal;

means for integrating said baseband signal over a discrete timing interval to provide a phase shift signal representing the amount by which the phase of said frequency encoded signal has shifted over said interval;

means for quantizing said phase shift signal into integral and fractional parts; and, means responsive to said fractional part of said quantized phase shift signal for providing error compensation for said baseband signal.

* * * * *